Patented July 20, 1937

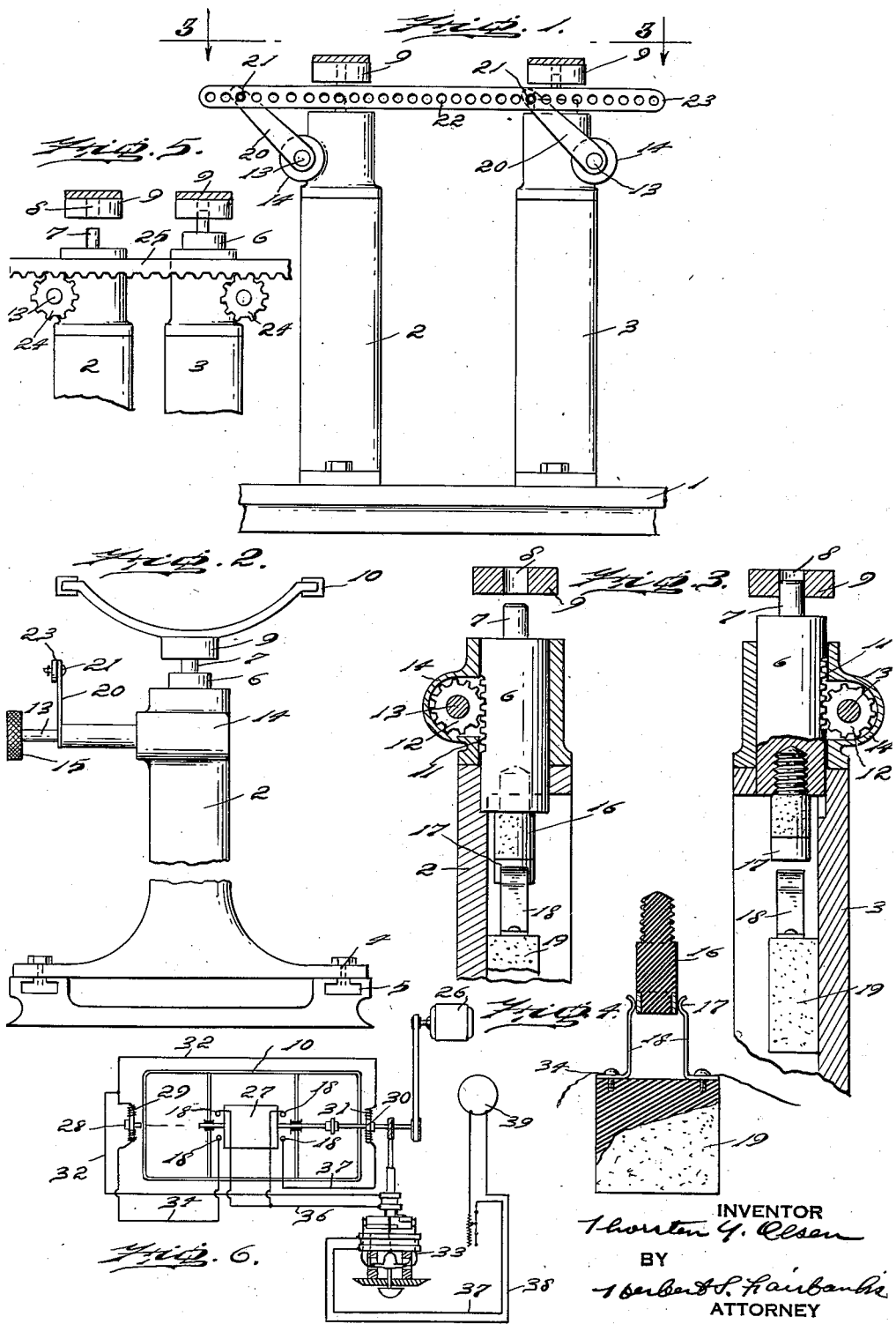

2,087,653

UNITED STATES PATENT OFFICE 2,087,653

PIVOT AND CIRCUIT CONTROLLING MECHANISM FOR BALANCING MACHINES

Thorsten Y. Olsen, Philadelphia, Pa.

Application May 31, 1935, Serial No. 24,192

5 Claims. (Cl. 73—51)

In certain types of machines employed for the balancing of rotatable bodies, the body to be tested is mounted for rotation on a vibratory support, and pivot forming means are provided to form, in a selected plane, a fixed pivot for the vibratory movements of the frame and the rotatable body carried by it. The standards which carry the pivot forming means are preferably longitudinally adjustable on the bed of the machine so that they can be selectively positioned in desired planes.

In balancing machines of this character, it has heretofore been deemed necessary to individually adjust each pivot, and also, if employed, the electrical circuits for a right or left fixed pivot for the vibratory movements of the frame.

With the foregoing in view, the object of my invention is to devise novel mechanism whereby the locking of one pivot automatically effects the unlocking of the other pivot.

It further comprehends novel pivot controlling mechanism wherein the locking of one pivot automatically opens one electric circuit for translating vibrations due to unbalance, into electrical energy to determine the unbalance in one plane of the body under test, and automatically unlocks the other pivot and automatically closes another electric circuit for translating vibrations due to unbalance into electrical energy to determine the unbalance in a second plane of the body under test.

Other novel features of construction and advantage will hereinafter more clearly appear in the detailed description and the appended claims.

For the purpose of illustrating the invention, I have shown in the accompanying drawing, typical embodiments of it, which, in practice, will give satisfactory and reliable results. It is, however, to be understood that the various instrumentalities of which my invention consists can be variously arranged and organized, and my invention is not limited to the exact arrangement and organization of these instrumentalities, as herein set forth.

Figure 1 is a front elevation, partly in section of a portion of a balancing machine having pivot and circuit controlling mechanism embodying my invention.

Figure 2 is an end elevation.

Figure 3 is a vertical section taken on line 3—3 of Figure 1.

Figure 4 is an elevation partly in section, showing more particularly circuit opening and closing means.

Figure 5 is a side elevation, partly in section of another embodiment of my invention.

Figure 6 is a wiring diagram.

Similar numerals indicate corresponding parts.

Referring to the drawing:—

1 designates the bed of a balancing machine which carries pivot and circuit closing mechanism embodying my invention.

The balancing machine may be of any conventional or desired type where the rotatable body to be tested is mounted on a vibratory frame or cradle having a vibratory support fixed to or adjustable longitudinally of the bed.

The balancing machine is preferably constructed in accordance with the British Patent No. 420,383 of November 30, 1934, or the S or H types of balancing machines disclosed in catalogue 50, part K, Balancing equipment, of the Tinius Olsen Testing Machine Company of Philadelphia, Pa. 2 designates a pivot bracket for a right end correction of the specimen and 3 designates a similar pivot bracket for a left end correction. As each of these pivot standards are of the same construction a detailed description of one of them will suffice for both. Each pivot bracket has a base which can be fixed along the bed by means of securing members 4 adjustable in longitudinal slots 5 in the bed 1. Each pivot bracket is bored out to receive a carrier 6 having at its upper end a pivot 7 receivable in an aperture 8 in a cross bar 9 longitudinally adjustable along the side rails of a frame or cradle 10 on which the rotatable body to be tested is rotatably mounted. Each pivot carrier 6 is of conducting material and has rack teeth 11 which mesh with a pinion 12 on a shaft 13 journalled in a boss 14 on a pivot standard. One of the shafts 13 is provided with a grasping handle 15. Each pivot carrier 6 has secured to it an insulated plug 16 which as illustrated is screwed into the lower end of its carrier, and at the lower end of the plug a conducting contact 17 is fixed. The contact 17 cooperates with the contact springs 18 carried by mounting member 19 of insulating material fixed within its pivot bracket 2 or 3.

Each shaft 13 has fixed to it one end of an arm 20, the opposite end of which as shown in Figure 1 is connected by a pin 21 with a selected aperture of a row of apertures 22 in a connecting link 23.

The arms 20 may be connected in any desired manner. For example, the shafts 13 may have fixed to them pinions 24 which mesh with a rack 25 as shown in Figure 5. It will thus be clear that an upward movement of one pivot 7 will cause a downward movement of the other pivot 7.

In other words the locking of one pivot causes the unlocking of the other pivot.

Referring now to the wiring diagram seen in Figure 6, it will be understood that an electric motor 26 is operatively connected with the body 27 to be tested to rotate such body on its vibratory mounting on the frame 10. 28 is a permanent magnet carried by the frame and cooperating with pick up coils 29 when a right end pivot is used to generate an alternating electric current by vibrations of the frame due to unbalance in the rotating body 27. 30 is a permanent magnet cooperating with pick up coils 31 when a left end pivot is used for the vibratory frame to generate an alternating current by vibrations of the frame due to unbalance in the rotating body 27. One set of pick up coils is connected by line 32 to a collecting collar of a commutator 33 such as is disclosed in the B. E. Ohlson pending application, Serial No. 666,085. The other pick up coil of pick up coils 29 is connected by line 34 with one of the spring contacts 18 and the other of the contacts 18 is connected by line 36 with the commutator 33. The second pick up coil of pick up coils 30 is connected by line 37 with one of the contacts 18 for a right hand fixed pivot and the other contact 18 is connected by line 36 with the commutator. Lines 37 and 38 connect the commutator with a direct current electric meter 39.

In the wiring diagram shown, an alternating electromotive force is generated by the action of unbalanced forces in the rotatable body under test which is in proportion to the amplitude of vibration of the revolving body and the phase relation is dependent upon the location of the unbalance. The commutator integrates the alternating electromotive force and determines the limits of such integration. The integrated current is measured to determine the amount and angular location of the unbalance.

It is of course to be understood that the present invention in its broad aspects is not confined to any specific electric circuits or circuit and the wiring diagram shown is only for the purpose of illustrating one manner in which circuits may be automatically controlled by the locking and unlocking of the pivots for the vibratory frame.

The operation will now be apparent to those skilled in this art.

The pivot brackets 2 and 3 are adjusted along the bed and fixed in position to provide for having the pivots in desired planes.

If the handle 15 is turned in a direction to raise the pivot 7 of pivot bracket 3 into locked position with the frame 10, the link 22 or rack 25 will during such raising cause the pivot 7 of pivot bracket 2 to be lowered. This provides a right hand locked pivot for the vibratory movements of the frame. As the pivot carrier 6 of pivot bracket 3 is moved upwardly, the contact band 17 for pivot bracket 3 moves out of engagement with contacts 17 thus opening the circuit for the right hand fixed pivot. At the same time the contact band 17 for pivot bracket 2 is moved downwardly to close the circuit through lines 34 and 36.

It will be apparent that in a similar manner when the left hand pivot is locked the circuit provided for it is opened, and the circuit is closed through lines 36 and 37.

In other words, the locking of one pivot opens its electric circuit, effects the unlocking of the other or second pivot and the closing of the circuit for the second pivot. By the term locking of the pivot, I include any means for moving a pivot into pivotal engagement with the frame, and the term unlocking of a pivot defines the movement of a pivot out of pivotal engagement with the frame.

Having thus described my invention, what I claim as new and desire to secure by Letters Patent is:

1. In a balancing apparatus, a vibratory frame, a vibratory support for said frame, two pivots for selectively forming a right or left fixed pivot for the vibratory movements of the frame, independent electric circuits for each pivot to translate vibratory movements of said frame into electrical energy for measuring unbalance forces of a specimen on said frame, and means actuated by the locking of one pivot to open its electric circuit, effect the unlocking of the other pivot and the closing of the electric circuit for such other pivot without affecting said vibratory support.

2. In a balancing apparatus, a vibratory frame, two pivots for selectively forming a right or left fixed pivot for vibratory movements of said frame, means to lock one of the pivots, an electric circuit created by vibratory movement of the vibratory frame to measure the unbalanced forces in a specimen under test and means actuated by the locking of a pivot to control said electric circuit.

3. In a balancing apparatus, a vibratory frame, pivot brackets on the frame, pivot carriers movable in the pivot brackets and having racks, pinions meshing with said racks, rock arms on the pinions, a bar adjustably connecting said rock arms, and an electric circuit for each pivot indicative of unbalance forces in a rotatable specimen on said frame and including a contact carried by its pivot carrier to open or close its circuit.

4. In a balancing machine, a vibratory frame, a vibratory support for said frame, a right and left pivot for selectively forming a locked pivot for vibratory movements of the frame, an electric circuit for each pivot, said electrical circuits being indicative of unbalanced forces in a specimen under test, said electrical circuits translating vibratory movements of said frame into electrical energy for measuring unbalanced forces of a specimen on said frame, independent means to actuate each pivot, means connecting said independent means whereby the locking of one pivot effects the unlocking of the other pivot without affecting said vibratory support, said connecting means being adjustable to regulate the extent of movement of the pivots.

5. In a balancing apparatus, a vibratory frame, pivot brackets adjustable longitudinally of the frame, pivot carriers in the brackets, pivots on the pivot carriers, and an electric circuit indicative of unbalanced forces in a specimen under test for each pivot carrier which is open when its pivot is unlocked and closed when its pivot is locked, and means to move each pivot carrier to bring its pivot into and out of locked pivotal engagement with the frame and to cause one pivot to be unlocked when the other pivot is locked.

THORSTEN Y. OLSEN.